United States Patent [19]

Oskam

[11] 4,281,899
[45] Aug. 4, 1981

[54] ADJUSTING DEVICE FOR MOTORCAR MIRRORS

[75] Inventor: Aane A. Oskam, De Meern, Netherlands

[73] Assignee: Industrie Koot B.V., Montfoort, Netherlands

[21] Appl. No.: 76,953

[22] Filed: Sep. 19, 1979

[30] Foreign Application Priority Data

Jul. 26, 1979 [NL] Netherlands .......................... 7905806

[51] Int. Cl.³ .......................... B60R 1/06; G02B 7/18
[52] U.S. Cl. .................................................. 350/289
[58] Field of Search ................ 350/289; 248/476, 479, 248/487

[56] References Cited

U.S. PATENT DOCUMENTS

| | | | |
|---|---|---|---|
| 3,609,014 | 9/1971 | Kurz, Jr. ............................. | 350/289 |
| 4,114,988 | 9/1978 | Enomoto ............................. | 350/289 |
| 4,116,538 | 9/1978 | Oskam ................................. | 350/289 |
| 4,158,483 | 6/1979 | Fisher et al. ........................ | 350/289 |

*Primary Examiner*—F. L. Evans
*Attorney, Agent, or Firm*—Wenderoth, Lind & Ponack

[57] ABSTRACT

A device for adjusting the mirror of an automotive vehicle, as disclosed in U.S. Pat. No. 4,116,538, includes drive and transmission devices consisting of two motors, each provided with a planetary transmission system mounted on a motor shaft, the two motor transmission systems being arranged mirror-symmetrically relatively to a median plane of a housing, the median plane containing the axis of a stiffening element.

6 Claims, 4 Drawing Figures

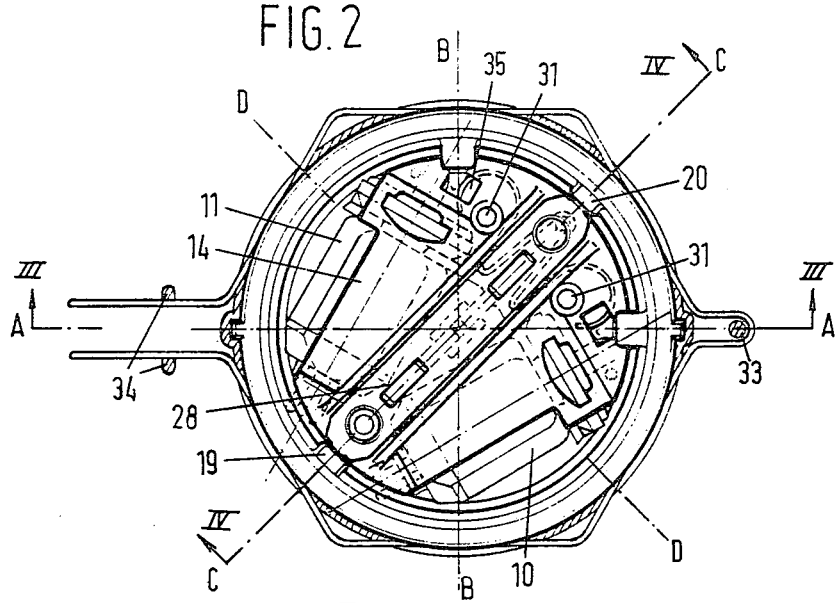
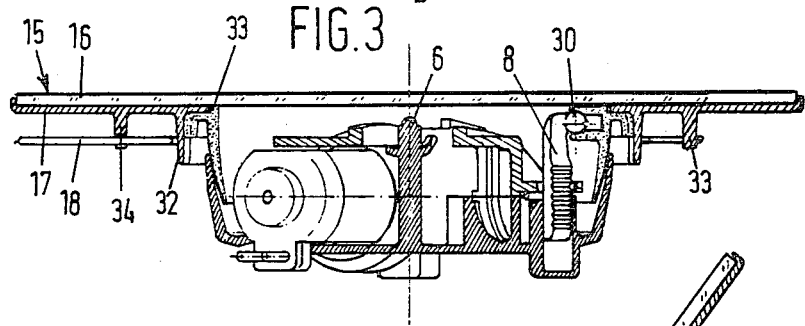
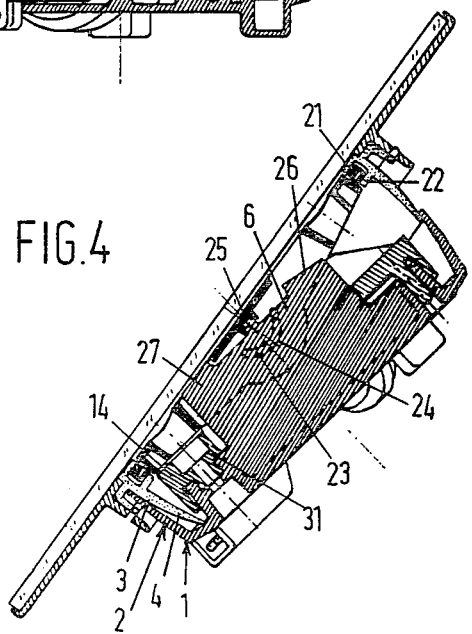

ADJUSTING DEVICE FOR MOTORCAR MIRRORS

BACKGROUND OF THE INVENTION

This invention relates to an adjusting device for motorcar mirrors.

In U.S. Pat. No. 4,116,538 there is described a device for adjusting a motorcar mirror about two perpendicular axes, which device essentially consists of a cup-shaped housing having a raised edge, an adjusting ring mounted therein for tilting movement, which ring in any position is in sealing contact with the raised edge, and is supported in its center by means of a stiffening element extending along a ring diameter, and further having two mirror adjusting members engaging with the adjusting ring and being off-set relatively to each other through 90°, and drive means and transmission means, whose output shafts are operatively associated with the mirror adjusting members.

In this prior device, the drive and transmission means are formed by one single unit consisting of a motor which is reversible with regards to the direction of rotation, a clutch and two planetary transmission systems. This combined unit can be excellently accommodated in an instrument housing of relatively large dimensions, which therefore must in turn be housed in a mirror housing, likewise of large dimensions, mounted on an automotive vehicle. In order that the mirror adjusting device may also be suitable for smaller motorcars, and hence smaller mirror housings, it is desirable for them to be constructed as compact as possible, and so to avoid a relatively large combined drive-and-transmission unit.

In addition to reducing the size of the device proper, a further saving in space can be realized by placing the mirror adjusting device eccentrically relative to the mirror center, because mirror housings on motorcars have an asymmetrical form, with the depth of the housing being less accordingly as the distance from the sidewall of the motorcar is larger. When the mirror adjusting device is placed eccentrically there is the risk that the mirror turns about an axis perpendicular to the plane of the mirror and consequently comes to hang askew in its housing. This not only meets with esthetic objections, but also increases the risk that, when subjected to jolting or bumping, an edge of the mirror comes into contact with an edge of the mirror housing, which is undesirable. In order that an eccentric location of the mirror adjusting device may be possible, the device itself should have a high torsional stiffness.

In addition to a compact construction and a high torsional stiffness at positions it is also desirable that tilting axes should be provided, spaced as closely from the actual mirror surface as possible, this to make the space between the edge of the mirror housing on the motor vehicle and the edge of the mirror as small as possible.

SUMMARY OF THE INVENTION

In order to provide a compact construction, the device according to the present invention is characterized in that the drive and transmission means consist of two motors, each provided with a planetary transmission system mounted on the motor output shaft, the two motor transmissions systems being arranged mirror-symmetrically relative to a median plane of the housing, the median plane containing the axis of the stiffening element. Preferably, the axes of the two motor transmission systems enclose an acute angle.

Owing to the smaller drive and transmission systems and their mirror-symmetrical arrangement in the instrument housing, an optimum division of the space available in the housing is achieved, so that the instrument housing can be made considerably smaller. Furthermore, as a result of the arrangement selected, the two mirror adjusting members can act directly on the adjusting ring, this in contrast with the construction described in the above U.S. Pat. No. 4,116,538, in which one of the output shafts of the drive and transmission means acts on the mirror adjusting member indirectly through the stiffening element, which is of sector-shaped form. Moreover, the construction according to the present invention has two additional tilting axes, one of which extends according to the center line of the stiffening element and the other of which is perpendicular to this center line. The adjustment of the mirror about these additional tilting axes is effected by operating the two motors simultaneously in the same or contrary directions of rotation.

The increased torsional stiffness of the mirror adjusting device according to the present invention is realized in that the cup-shaped housing is provided with a ridge extending according to the median plane, with the stiffening element being of U-shaped cross-sectional configuration and having its legs located on opposite sides of the ridge. In this way, a rotation of a mirror plate placed eccentrically on the mirror adjusting instrument relative to the adjusting instrument is not possible, even with heavy mirror plates and large eccentricities. Owing to the combination of a ridge and a stiffening element embracing this ridge, the pivotal support of this stiffening element can be effected in a simple manner by means of a semi-cylindrical fulcrum, spaced a very short distance from the mirror plate, with crescent-shaped guide lugs being provided on the ridge below the fulcrum, which lugs can snappingly engage with correspondingly shaped recesses in the legs of the U-shaped stiffening member. In this way the stiffening member can pivot about the fulcrum and remains connected to the ridge by means of the crescent-shaped guide lugs.

In addition to this fulcrum, the adjusting ring can also tilt about pins with which the stiffening member is mounted in the adjusting ring. From considerations of strength, these pins must have a certain thickness, while on the other hand the tilting axis must be as closely behind the mirror plate as possible, which requirement leads to connecting pins as thin as possible. These contradictory requirements can be met by providing the pins mounted at the end of the stiffening member with a V-shaped recess, while the bearing holes in the adjusting ring are of anchor-shaped form with a knife edge mounted in the V-shaped recess of the pins, the arrangement being such that the adjusting ring can rock from its position of equilibrium into both directions through approximately 20°. Owing to these features, the space between the rim of the mirror housing mounted on a vehicle and the circumferential edge of the mirror plate may be minimal. Such a minimal space, however, involves the problem that a mirror plate which, in accordance with U.S. Pat. No. 4,116,538, is secured to the adjusting instrument by means of a snap connection, cannot be easily replaced after being mounted in a mirror housing, because there is no space for loosening the snap lugs engaging behind the turned-up edge of the adjusting ring, for example with a screw-driver. In order that the mounted mirror plate may yet be readily removed from the mirror adjusting instrument, according to the present invention, a hexagonally bent mounting spring is used as a fastening means, which spring is connected on the one hand to the mirror mounting plate, and whose six straight edges can engage behind the turned-up edge of the adjusting ring. This mounting spring terminates in two parallel legs, whose ends project beyond the mirror mounted on the instrument, which legs are retained under tension between two confining pegs on the mirror mounting plate. When the ends of these two parallel legs are moved towards each other and subsequently moved backwards, the mounting spring is released from the pegs on the mirror mounting plate, and also from the turned-up edge of the adjusting ring, whereafter the mirror can easily be removed and replaced by another one.

BRIEF DESCRIPTION OF THE DRAWINGS

One embodiment of the device according to the present invention will now be described, by way of example, with reference to the accompanying drawings, in which

FIG. 2 is a front elevation of the mirror adjusting instrument without the mirror;

FIG. 3 is a cross-sectional view, taken on the line III—III of FIG. 2, with a mirror plate being mounted on the adjusting instrument; and FIG. 4 is a cross-sectional view, taken on the line IV—IV of FIG. 2, in which the adjusting instrument is also provided with a mirror plate.

DETAILED DESCRIPTION OF THE INVENTION

Figure 1:
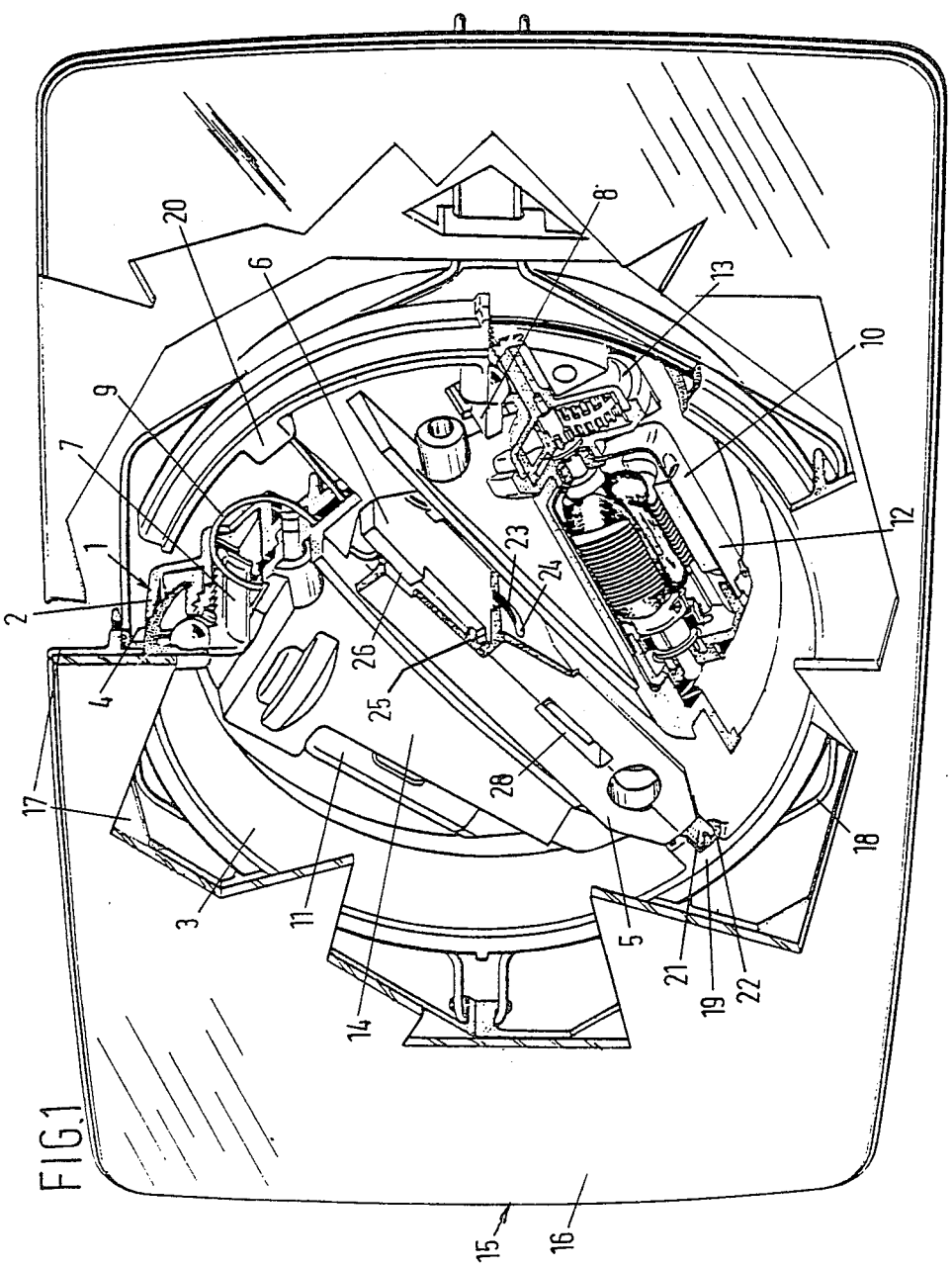
FIG. 1 is a front elevation, with some parts being broken away, of a mirror adjusting instrument with a mirror mounted thereon.

As best shown in FIG. 1, the mirror adjusting instrument according to the present invention comprises a cup-shaped housing 1 having a raised edge 2, preferably made of a suitable synthetic plastics material. Mounted within housing 1 is an adjustable ring 3, also made of a synthetic plastics material, with a spherical side surface 4 resting on the raised edge 2 of housing 1, so that ring 3 can rotate in all directions without losing contact with housing 1 and hence with friction. Mounted in adjusting ring 3 is a stiffening element 5, in FIG. 1 placed diagonally at an angle of 45°, which element is coupled to a ridge 6 formed integrally with instrument housing 1. Provided on the vertical and horizontal axes of the instrument are adjusting arms 7,8, made of synthetic plastics material, which arms by means of a steel zig-zag spring 9 form the coupling between adjusting ring 3 and drive units 10,11 for the adjustment of the mirror. Each drive unit 10,11 consists of an electric motor 12 coupled to a planetary transmission system 13, the toothed output shaft of which meshes with the likewise toothed associated adjusting arm 7,8. The drive units 10,11 and spring 9 are retained in position by a confining plate 14 which is forced into instrument housing 1 by means of a snap connection. After the adjusting instrument has been mounted in a mirror housing, not shown, and secured to a motor vehicle, mirror plate 15, consisting of a mirror glass 16, a mounting plate 17 and a mounting spring 18, is snapped onto adjusting ring 3.

THE MIRROR SUPPORTING STRUCTURE

The mirror supporting structure consists of instrument housing 1, mirror adjusting ring 3 and the stiffening element or pivot member 5. During the manufacture of instrument housing 1, by injection moulding, a number of projections are formed on the bottom of this housing, the form of which is adapted to that of the combined drive-transmission systems 10,11, so that these units can be placed in housing 1 so as to be confined in two directions (see FIG. 3). Also formed on the bottom is a ridge 6, extending according to a median plane, and in the vertical direction projecting from the raised edges 2. In the center, ridge 6 is provided with a semi-cylindrical fulcrum 25, on which pivot member 5 can be supported. Provided on opposite sides of this fulcrum 25 on the upper edge of ridge 6 are two lugs 26,27, which fit slots 28 formed in pivot member 5. Lugs 26,27 are beveled at the top, which top comes to lie substantially in contact with mirror glass 16 when mirror 15 has been adjusted in the longitudinal direction of ridge 6 up to its end position. Lugs 26,27 serve to effect maximum resistance against torsion of member 5 and adjusting ring 3, connected to it, as well as mirror plate 15 relative to housing 1.

As clearly apparent from FIG. 2, drive units 10,11 are arranged in housing 1 mirror-symmetrically relative to ridge 6, and the axes of these drive units 10,11 enclose an acute angle. The output shafts of each planetary transmission 13 of drive units 10,11 terminate adjacent to the raised edge of housing 1 spaced apart an arcuate distance of 90°.

Provided below fulcrum 25 of ridge 6, and on opposite sides, are crescent-shaped guide lugs 23 with the concave side facing upwardly. These crescent-shaped lugs can engage with correspondingly shaped slots 24, provided in the side legs of member 5. In order that this member 5 can be easily moved from above over ridge 6, the crescent-shaped lugs are beveled downwardly and outwardly, so that there is a snapping connection between member 5 and ridge 6. The top sides of ridge 6, member 5, lugs 23 and slots 24 are formed so that member 5 can rock from the position of equilibrium through 20° in both directions.

Member 5 is provided at each of its two ends with a pin 21 that can be received in a hole 22 in adjusting ring 3. The two pin-and-hole connections 21,22 form the pivots 19,20 about which the adjusting ring 3 can turn relative to member 5. In order that the axis of rotation of pivots 19,20 may be as close to the back of mirror plate 15 as possible, pins 21 are provided with a V-shaped notch, with the apex of the V being located above the axis of pin 21. Holes 22 are formed in a corresponding manner. They are essentially round, but opposite the V-shaped recess in pin 21 they have a V-shaped knife edge, with the two legs of this knife edge enclosing a more acute angle than do the legs of the V-shaped recess in pin 21. The form of the hole is indicated herein as anchor-shaped.

Member 5 is mounted in adjusting ring 3 by pinching the latter into an oval shape and after member 5 has been introduced releasing it again, whereafter ring 3 re-assumes its round form and member 5 is received by its end pins 21 in holes 22 of ring 3. After ring 3 has been mounted in housing 1, the spherical surface 4 of ring 3 is in contact with the raised edge 2 of instrument housing 1 with slight friction. This friction prevents a mirror plate 15 mounted on ring 3 from being vibrated by whirling air, while the interior of housing 1 is thus adequately sealed from dust and moisture.

THE MIRROR DRIVE AND THE CONNECTION OF THE DRIVE UNITS TO THE ADJUSTING RING

Provided in instrument housing 1 are two drive units 10,11, each consisting of a motor 12, the output shaft of which is coupled to the sun wheel of an associated planetary transmission system 13. This planetary transmission system is of the same type as described in U.S. Pat. No. 4,116,538, referred to hereinbefore, and will not, therefore, be described in more detail herein. The toothed output shaft of each planetary transmission system 13 is in mesh with an adjusting arm 7,8, which is partly formed as a rack. Arms 7 and 8 are provided at their ends with a ball 30, which is snappingly received in adjusting ring 3. The two arms 7,8 are of identical construction. The points of engagement of balls 30 of the two arms 7,8 are peripherally spaced a distance of 90°, i.e. 45° on opposite sides of a pivot 20 of member 5. The zig-zag spring 9 forces the toothed portion of the two arms 7,8 into contact with the teeth of the output shafts of the planetary drive systems 13 in order that the two toothed members may be maintained in mesh with each other. If, however, mirror plate 15 is subject to an external force, the toothed portion of arms 7,8 may be released from the teeth on the output shaft of the associated planetary transmission system against the action of spring 9, so that arms 7,8 can move over the associated gear wheel without any damage to the drive. The same effect takes place when the adjusting instrument has arrived at the end of its stroke and the associated motor continues to run. In that case the teeth of arms 7,8 and of the output shafts of the planetary transmission systems 13 slide over one another against the action of spring 9.

At their ends remote from ball 30, adjusting arms 7,8 are provided on the surface facing spring 9 with a hook-shaped projection 35, which during the outgoing stroke of arms 7,8 comes to lie in abutment with spring 9, whereby the stroke of the instrument is stopped.

When motor 12, associated with drive unit 11, is energized, adjusting ring 3 and hence mirror plate 15 mounted on it will tilt about axis A-A (see FIG. 2). The fixed points on axis A-A are the fulcrum 25 of member 5, and the ball of arm 8, snapped into ring 3. The tilting movement about axis A-A is composed of a tilting movement of member 5 about axis D-D (see FIG. 2) and a tilting movement about the pivots 19,20 of member 5. When motor 12 of drive unit 10 is energized mirror plate 15 is tilted similarly about axis B-B. When motors 12 of drive units 10,11 are simultaneously driven in the same direction, mirror plate 15 is tilted about axis D-D and when the two drive motors are turned in opposite directions of rotation, the mirror is tilted about axis C-C.

THE MOUNTING OF VARIOUS PARTS

The parts of the adjusting device are all kept in position by a retaining plate 14, the function of which is to confine drive units 10,11 and take up forces arising from the pressure of spring 9 and from the adjustment of the device. Spring 9 can be mounted in plate 14 in pretensioned condition, whereafter plate 14 is placed over drive units 10,11 and secured by means of three hollow snap pins 31 (see FIG. 4), which are formed integrally with plate 14, in corresponding recesses in the instrument housing 1. The three snap pins 31 are hollow to receive three bolts for securing the mirror adjusting device 1 in a mirror housing, and these three bolts also serve for clamping plate 14 on the instrument housing 1.

THE MOUNTING OF THE MIRROR PLATE

Mirror plate 15 is composed of a mirror glass 16 which by means of an adhesive layer is secured to a mirror mounting plate 17. Plate 17 has a raised edge 32, which is contiguous with the outer circumferential rim of adjusting ring 3. Plate 17 further has a recess shaped to match raised edge 33 (see FIG. 3) of the adjusting ring, so that edge 33 comes to lie in direct contact with the rear surface of mirror glass 16, to which it is glued. The mirror glass 16 thus also functions as a cover for the adjusting device, and the adhesive layer on the rear surface of the mirror also serves as a sound and vibration insulating layer. Formed in the raised edge 32 of the mirror mounting plate are six slots, which fit a mounting spring 18, bent into hexagonal form. At the closed side, this spring 18 is laid around a peg 33 provided on the rear surface of mirror mounting plate 17, and subsequently through the six slots in the raised edge 32, whereafter the two spring legs at the open spring end are confined under tension between two pegs 34, which are likewise provided on the rear surface of plate 17. When plate 17 is forced onto ring 3, the six straight sides of spring 18 spring behind the outer edge of ring 3. In this way plate 15 is retained on ring 3 at six points spaced around its circumference.

When plate 15 must be removed from the adjusting instrument, the two legs of spring 18 projecting beyond plate 15 are pinched together and forced backwards so that they come to lie outside pegs 34. Spring 18 is thus released from ring 3, and plate 15 can be detached from ring 3, during which operation the narrow adhesive strip between ring 3 and the rear surface of the mirror is broken.

I claim:
1. A device for adjusting the mirror of an automotive vehicle about at least two perpendicular axes, said device comprising:
   a cup-shaped housing having a raised edge and a ridge extending along a median plane of said housing;
   said ridge having an upper edge having at the center of the length thereof a substantially semi-cylindrical fulcrum;
   a tiltable adjusting ring mounted in said housing for relative movement with respect thereto, said ring being in sealing contact with said raised edge of said housing in all positions of said ring;
   a stiffening element of U-shaped cross-sectional configuration defined by two legs, said stiffening element having opposite ends received in diametrically opposed holes in said adjusting ring, and said stiffening element being mounted in contact with said semi-cylindrical fulcrum of said ridge and with said two legs positioned on opposite sides of said ridge;
   first and second mirror adjustment members mounted for engagement with said adjusting ring at positions off-set from each other by 90° with respect to said adjusting ring, each said adjustment member including a rack portion; and
   first and second drive and transmission means for achieving relative movement of said ring with respect to said housing in at least two perpendicular axes, said first and second drive and transmission means being arranged mirror-symmetrically relative to said median plane of said ridge of said housing and extending in directions enclosing an acute angle, each said drive and transmission means comprising a motor having an output shaft, a planetary transmission system mounted on said motor output shaft and having an output shaft, and a gear fixed to said transmission system output shaft and engaging a said rack portion of a respective said adjustment member.

2. A device as claimed in claim 1, wherein said ridge has opposite side walls, each having thereon a crescent-shaped guide lug at a position below said fulcrum, each said leg of said stiffening element has formed therein a crescent-shaped recess, and said guide lugs are snappingly engaged in said recesses.

3. A device as claimed in claim 1, wherein each said opposite end of said stiffening element comprises a pin having therein a V-shaped recess, each said hole in said adjusting ring comprises an anchor-shaped bearing hole, and each said pin is journalled into a respective said bearing hole such that said adjusting ring is rockable with respect to said housing and said ridge from a position of equilibrium thereof through approximately 20° in opposite directions.

4. A device as claimed in claim 1, wherein said drive and transmission means are retained in said housing exclusively by a retaining plate having at least three pins snappingly engaging in respective recesses in said housing.

5. A device as claimed in claim 1, wherein said ring has a raised edge, and further comprising a mirror glued to a mirror mounting plate secured to said ring by fastening means comprising a hexagonally shaped mounting spring having six straight sides, said spring being connected to said mounting plate, with said six straight sides engaging behind said raised edge of said ring.

6. A device as claimed in claim 5, wherein said spring has two ends in the form of parallel legs extending outwardly and retained under tension between two pegs on said mounting plate.

* * * * *